United States Patent
Schmitt

(10) Patent No.: US 7,298,427 B2
(45) Date of Patent: Nov. 20, 2007

(54) METHOD FOR APPLYING SUBSTANCES WITH LIQUID CRYSTALS TO SUBSTRATES

(75) Inventor: Peter Schmitt, Würzburg (DE)

(73) Assignee: KBA-Metronic AG, Veitshochheim (DE)

( * ) Notice: Subject to any disclaimer, the term of this patent is extended or adjusted under 35 U.S.C. 154(b) by 397 days.

(21) Appl. No.: 10/876,256

(22) Filed: Jun. 24, 2004

(65) Prior Publication Data

US 2004/0263592 A1   Dec. 30, 2004

(30) Foreign Application Priority Data

Jun. 25, 2003  (DE)  ............................... 103 28 742

(51) Int. Cl.
*G02F 1/13* (2006.01)
(52) U.S. Cl. ........................................................... 349/3
(58) Field of Classification Search .................... None
See application file for complete search history.

(56) References Cited

U.S. PATENT DOCUMENTS

| | | | |
|---|---|---|---|
| 5,006,170 A * | 4/1991 | Schwarz et al. ........... 106/31.3 |
| 5,458,804 A * | 10/1995 | Yamada et al. ............. 349/134 |
| 5,571,749 A * | 11/1996 | Matsuda et al. ............ 438/484 |
| 5,599,412 A | 2/1997 | Faris |
| 5,643,357 A | 7/1997 | Breton et al. |
| 5,876,492 A | 3/1999 | Malhorta et al. |
| 6,309,060 B1 | 10/2001 | Timmermans-Wang et al. |
| 6,769,765 B2 * | 8/2004 | Kneezel et al. ................ 347/93 |
| 6,795,139 B1 * | 9/2004 | Kameyama et al. .......... 349/96 |
| 6,867,840 B2 * | 3/2005 | Hsieh et al. ................. 349/187 |
| 6,939,478 B2 * | 9/2005 | Iftime et al. ........... 252/299.01 |
| 2003/0174276 A1 * | 9/2003 | Umeya ....................... 349/194 |

FOREIGN PATENT DOCUMENTS

| | | |
|---|---|---|
| DE | 26 35 226 | 2/1978 |
| DE | 42 05 713 | 8/1993 |
| DE | 690 11 593 | 3/1995 |
| DE | 44 41 651 | 4/1996 |
| DE | 101 06 415 | 8/2002 |
| EP | 0 298 580 | 1/1989 |
| JP | 08281350 | 2/1996 |
| JP | 20020127486 | 5/2002 |
| WO | WO 02/085642 | 10/2002 |

* cited by examiner

*Primary Examiner*—David Nelms
*Assistant Examiner*—Richard H Kim
(74) *Attorney, Agent, or Firm*—Andrew Wilford

(57) ABSTRACT

The invention relates to a method for applying substances comprising liquid crystals to substrates, wherein the substance is maintained at a working temperature inside a coating device, in particular a printing mechanism, the substance being in a liquid state at said temperature and the liquid crystal components contained in the substance being in a mesomorphous state. Furthermore, the invention relates to a printing machine whose components, in particular ink chamber, screen roller, transfer rollers, distributor rollers, printing cylinders and impression cylinders can be individually heated.

9 Claims, No Drawings

METHOD FOR APPLYING SUBSTANCES WITH LIQUID CRYSTALS TO SUBSTRATES

The invention relates to a method and devices for applying substances which comprise liquid crystals to substrates, in particular, for coating or printing different materials with e.g. low-molecular liquid crystal mixtures.

E.g. low-molecular, primarily photochemically polymerizable liquid crystal mixtures or their components are known in the prior art. They can be obtained, for example, from the firm Merck KGaA and are subject of e.g. DE 198 34 162 A1 and GB 2 280 445. In part, the preparation of such individual components is described in the literature, e.g. in D. J. Broer et al, Makromol. Chem. 190, 1989, 3201-3215.

To coat or print such mixtures, only solutions based on organic solvents, e.g. toluene, have been used to date. Processing solvent-free liquid crystal systems in coating or printing processes is not known.

Furthermore, it is known to add additives to obtain the processibility in coating and printing processes. These are either solvents, e.g. toluene, ethyl acetate, ethanol and butyl acetate, which are used alone or in association with dispersing adjuvants and defoaming agents, e.g. polyvinyl pyrrolidone, polyvinyl alcohol, cellulose ether, gelatines Byk 055 and Byk 057 (Manufacturer: the Firm Byk, Wesel) as well as perhaps water.

Or these are pasty mixtures at room temperature which, although they are free of organic solvents, contain dispersing agents of the alkenyl or alkyl succinic acid derivative type.

Coating processes based on liquid-crystalline polymers are also known. As described e.g. in DE 690 29 683 T3, the corresponding liquid-crystalline polymers are heated either to a temperature above the glass transition point and below the transition point in the isotropic phase, so that a flowable quality is given or the liquid-crystalline polymer is dissolved and applied in solution. As described e.g. in DE 694 13 746 T2, depending on the type of polymers, various solvents are used, e.g. chloroform, dichloroethane, tetrachloroethane, trichloroethylene, tetrachoroethylene, o-dichlorobenzene, tetrahydrofuran, dimethyl formamide, dimethyl acetamide, dimethyl sulfoxide and N-methyl pyrrolidone.

When using solvents, after evaporating the solvent, a further heat treatment is required for producing and orienting the liquid crystalline phase, similarly, when applying molten polymers, the desired texture is induced by an appropriate heat treatment at a temperature at which the polymer compound shows a liquid crystalline phase. The vitreous solidification and fixing then takes place in both cases by cooling to a temperature below the glass transition point.

The production and processing of hot-melt printing pigments and inks is prior art and the content of numerous patents, e.g. DE 4205713 A1, DE 2635226 A1 and EP 0700977 A1. These melt printing inks are usually composed of, at room temperature, solid solvents, binding agents and optional additives and pigments. In the case of (thermo) hot-melt ink jet methods important in this connection, U.S. Pat. No. 5,006,170 is known which is based on liquid crystal materials.

U.S. Pat. No. 5,006,170 relates to hot-melt ink compositions which are suitable for inkjet printing and comprise a coloring agent, a binder and a propellant. In one embodiment, the binder consists of a liquid crystal material, e.g. based on an alkyl-thio-beta-D-glycoside. Suitable inks have melting points which enable a quick melting of the ink and a quick solidification on the print substrate, as a result of which high printing speeds become possible. In addition, it is reported that hot-melt inks with liquid crystal binders have a high shear diluting capacity, which means that, during shearing or loading, the melt viscosity is reduced. The inks are subjected to shearing or loading when they run through the jet nozzles of the printer and the ink viscosity is reduced during the printing process, which results in an increased printing speed and also an improved print quality, since the reduced viscosity of the inks enables a high degree of interaction between the ink and the print substrate.

The nematic and chirally nematic liquid crystal systems which can be obtained from the firm Merck KGaA are, at room temperature, solid, white or yellowish, odorless powders and can therefore not be printed. By mixing with an organic solvent, preferably toluene, isotropic solutions are generated which are distinguished by an especially low flow viscosity and are therefore exceptionally suitable for obtaining uniform print films and for orienting the liquid crystal molecules in a planar, homogeneous Grand Jean texture. In addition, it is possible to control the layer thicknesses of the liquid crystal print films via the solid content of the solutions.

The practical testing of this so-called solvent method has a number of serious disadvantages.

For example, liquid crystal systems containing solvents can only be used to a limited extent for printing solvent-sensitive substrates Absorbent substrates in turn, e.g. paper, can result in a bleeding appearance of the typography since the ink can easily penetrate into the paper and spread in it by following the fibre lines.

The desired optical effects, for example color effects, often also change during printing of most liquid crystal films with solvent-containing liquid crystal inks due to diffusion and extraction processes. Combustible, poisonous or otherwise harmful solvents, such as tetrahydrofuran, 2-butanone, toluene and xylene must often be used to obtain a sufficiently high concentration with which extensive and costly mechanical and structural safety measures become necessary.

In particular, these relate to protection against explosion with regard to the electrical fittings of the inner engine room of the printing machine and the working environment, the use of corona installations for pretreating the print substrate or the use of UV hardening systems. In addition, high blower outputs are required for exhaustion and air return and, when large amounts of ink are printed, facilities for burning the solvent-containing waste air or solvent recovery for reasons of cost and due to environmental considerations.

Generally, in the presence of solvent(s) and when using radiation-hardening liquid crystal mixtures, the distance between printing mechanism and UV drying station as well as the remaining dimensions will increase decisively which becomes a problem for the print quality, subsequent processing of the printed matter, e.g. a film, the compactness, practicability and design of a coating or printing machine. To obtain reproducible printing results, additional steps must be taken against unreliable changes in concentration and viscosity of the printing substance due to premature solvent evaporation, especially on the printing rollers. Otherwise, the quality of the printed product would vary, in the worst case, inking parts of the printing mechanism, e.g. screen roller or cliche of a flexo printing mechanism can become blocked with crystallized liquid crystal ink, with corresponding consequences for the thickness of the print films obtained or the anisotropic, optical effects.

The parts coming into contact with the solvent-containing liquid crystal inks must, moreover, have a corresponding chemical resistance, so that the premature aging of pump hoses or the escape of troublesome components, e.g. softening agents, into the liquid crystal ink is prevented.

Individual or several components can separate from the solvent liquid crystal mixtures during storage and delivery. Above all, this is the case when a high concentraton range has been selected or, e,g. an aliphatic solvent, is added to the very easily dissolving (aromatic) toluene.

Dependent on the evaporation rate of the solvents used, the presence of solvents also results therein that only certain maximum printing speeds can be obtained which can also not be increased substantially with appropriate machine constructions. Finally, there could also be disadvantages for both the processor and the user when there is a reduction in the print quality due to remaining residual solvents, e.g. a reduced degree of polymerization or a reduction of the block stability.

The object of the invention is to overcome the disadvantages associated with the processing of solvent-containing liquid crystal mixtures and to provide a simple and to a large extent reproducible method and devices for applying substances which comprise liquid crystals.

This object is solved therein that the substance to be printed is maintained at a working temperature within an applicator, in particular a printing mechanism, at which the substance is in a liquid state and the liquid crystal components contained in the substance are in a mesomorphous state.

The important point is that the substances with the liquid crystals are kept in a liquid state during an application process, e.g. a coating or printing process, at an increased temperature. Typical liquid crystal formulations used here are in the solid phase at room temperature and can therefore not be applied, e.g. printed, in this state.

If the liquid crystals are brought into the molten, liquid state range by increasing the temperature, then the individual components of the mixture dissolve in one another to a certain degree without the presence of a solvent, whereby eutectic mixtures can form due to the special composition of certain liquid crystal mixtures, the melting point of said mixtures being lower than that of individual components.

In principle, to realize an application of said substances, all coating and printing processes are suitable as they are e.g. reacted in immersion, spraying, rolling and coating machines, offset, rotogravure printing, flexoprinting, letterpress and screen printing machines as well as hot-melt and drop-on-demand inkjet printers.

When using liquid crystal mixtures as offered, for example, by Merck KGaA, the working temperatures of the individual parts coming into contact with the liquid crystal mixtures must, for example, be in the range of 60-80° C., dependent on the liquid crystal mixtures used, so that, one the one hand, the solid, crystalline state with defined short-range and long-range order of the molecules in the liquid crystal mixture is neutralized, yet the completely isotropic, irregular, liquid phase is not as yet present, on the other hand.

Instead, an aggregate state between the solid (up to about 60° C.) and the liquid, isotropic phase (from about 80° C.), a so-called mesophase, at which the molecules are mobile, yet the molecule axes form an orderly structure is preferably strived for in this case. Depending on the liquid crystal mixture or the chemical structure of the molecules, after their dipole moment and other properties, various energetically advantageous one, two and three-dimensional order states can be established. Seen from a macroscopic point, the liquid crystal mixture thus appears as a liquid which can be processed with one of the noted printing processes, seen from a microscopic point, however, their molecules have an order to one another.

In association with the present invention, a distinction must be made between the nematic and the cholesterol (actually: chirally nematic) phases.

Their processing with coating and printing machines leads to exceptionally interesting optical effects which are suitable for the production of security-relevant markings for banknotes, securities, identity cards, documents, etc.

The hot-melt process according to the invention is distinguished by a number of mechanical and procedural advantages in comparison to processes based on solvents.

One advantage of the hot-melt process according to the invention is that, for example, conventional printing machines can be used as applicator which are furnished with heatable printing rollers and heatable ink chambers. The use of structural devices for exhaustion and disposal of solvent vapors is not required. This also excludes the danger for an attendant associated with solvent vapors during operation.

A further advantage is the reproducible production of the desired optical effects on the substrates since the liquid crystal concentration remains constant during the entire production period in the process according to the invention and does not depend on the solvent concentration as in the processes described above.

In this connection, it is also advantageous in the process according to the invention that no control unit for determining and maintaining a solvent concentration is required inherently which results in a simpler and thus more cost-effective printing machine.

A further advantage is that, due to the multitude of possible liquid crystal mixtures, a very large number of realizable optical effects also exists which each require different process parameters which can be easily and, above all, constantly set by the process according to the invention. Advantageously, this presents a number of new possibilities to combine different optical effects with one another to thus produce, for example, new security features.

To realize the process according to the invention, all current coating processes, such as e.g. immersion, spraying, rolling, coating, as well as the conventional printing processes such as e.g. offset, intaglio, flexo, letterpress, screen and relief printing as well as inkjet printing, are suitable.

A special embodiment, tested by way of example, is based on a flexoprinting machine whose printing mechanism components, namely ink chamber, screen roller, printing cylinder, inking rolls and pressers can be individually heated via appropriate aggregates. The temperature for the heat treatment is essentially defined by the mesomorphous temperature range of the liquid crystal mixture and the heat stability or sufficient physical strength of the substrate. With regard to the liquid crystal mixture, a temperature range is preferred in which a nematic or cholesterol (chirally nematic) phase is formed.

In the selected example, the respective nematogenous or chirally nematogenous liquid crystal components are first homogenized at a temperature of preferably 70° C. in a separate standard mixing apparatus, such as e.g. a two or three-roll mill, a dispersing unit, a bead mill or a suitable mixing and dispersing extruder, and the molten masses thus obtained are poured into molds. After solidification to form a solid microcrystalline mass, it is broken into small pieces or pulverized and the ink chamber is filled according to the required amount.

Preferably, the following working temperatures are set: ink chamber: 70° C., screen roller: 80° C., print cylinder: 70°

C., inking cylinder: 70° C., presser: 40° C. The printing cylinder is furnished with a cliché, a rubber cloth or a vulcanized rubber coating, the thickness of each of which is not more than 1-3 mm, so that as good a heat transfer as possible is given. The clichés and rubber cloths are anchored on the printing cylinder by suitable adhesive coatings which are resistant to smudging up to a temperature of about 70° C. (the Firms Tesa, Scapa Tapes, Lohmann), or magnetizable solid supports, e.g. made of steel or (in addition) mechanically anchored.

Under these conditions, the liquid crystal molten masses obtained are distinguished by low viscosities and surface tensions which are comparable to conventional radiation-hardening flexoprinting inks. In particular, viscosities of not more than 0.5 Pa·s, especially 0.1 to <0.4 Pa·s and surface tensions of not more than 38 mN/m, especially 34 to <36 mN/m are present. As a result, with larger amounts, a processibility, e.g. by means of an elastic tube pump, is possible.

There is also a very good flow and printing behaviour which manifests itself in the forming of uniform, homogeneous layers of print. Above all, the use of (polymer) flow improvers, reactive diluents and solvents can be omitted, the addition of which would either be accompanied with a perhaps undesirable modification of the anisotropic, optical properties of the liquid crystal print films forming on the print carrier, in any event, however, with a cost-intensive solvent use. It is significant that the flow viscosities and surface tensions of liquid crystal molten masses treated in this way offer ideal conditions for the spontaneous formation of the desired homogeneous textures of the liquid crystal films.

The molten liquid crystal materials exhibit a very good thermal stability and a very high compatibility with the materials of the printing mechanism. When using radiation-hardening liquid crystal mixtures and with appropriate exclusion of light, they can remain in the ink chamber after a printing process has been completed without the addition of inhibitors and cooled through many work cycles and heated again to working temperatures without suffering any damage, showing a spontaneous polymerization or resulting in deposits or blockages on the inking parts of the printing mechanism.

Procedurally, especially the forces, in particular shearing forces which act on the substrate, e.g. a film, and thus on the liquid crystal components of the mesomorphous phase when the printing cylinder is pressed against it, the decrease in temperature from 70° C. to about 20° C. due to the quick cooling on the substrate as well as the realization of a common flexoprinting layer thickness of about 0.5 to 2 µm contribute to the spontaneous induction of the homogeneous texture of the nematic or chirally nematic liquid crystalline phase.

A typography is thereby obtained which has color and/or polarization selective properties. Among other things, the dimensions are given both by the cliche used and by the screen and clichné roller. The term "typography" refers to images and symbols in the order of fractions of mm up to the entire surface, depending on requirement. The rapidly possible temperature drop to room temperature (about 20° C.) due to low working temperatures, the relatively slight layer thicknesses as well as the relatively high flow viscosities of the overcooled homogeneously oriented, liquid textures promote the very quick stabilization of the typography against a further flow on the substrate surface. A soaking into the capillaries of an absorbent printing material, e.g. paper, can also be completely, or to a great extent, prevented due to this hardening in radiation-hardening liquid crystal mixtures prior to the actual photopolymerization by e.g. actinic radiation.

The layer thicknesses can be varied by selecting the printing conditions. For example, thinner films are produced when using screen rollers having low draw volumes, at higher printing speeds, when producing additional ink dissociations during transport of the printing ink by integration of further rollers, by varying the contact pressure as well as by giving a high temperature and thus lower flow viscosity, as long as the isotropic phase transition temperature is not exceeded. The possibility for layer thickness reduction is too advantageous, especially in the nematic liquid crystal phases, since sufficient optical effects can already be given in this case with layer thicknesses of less than 1 µm and, as a result, printing of this type can be produced at a reasonable cost.

It is especially significant that the ink and polarization selective reflections of the liquid crystal films can also be realized without structure-forming treatment, e.g. frictional treatment of the substrate, without the presence of an orientation layer, e.g. based on polyvinyl alcohol or polyimide, without applying magnetic or electric fields, without the treatment of the substrate surface with alignment additives or the addition of these additives to the liquid crystal mixture.

After passing through the printing mechanism the liquid crystal films produced according to the invention are in the overcooled state, i.e. they do not imsubstancestely crystallize, although the ambient temperature of about 20° C. is less than the melting point. The optical effects do not change over a period of more than 10 minutes in the non-polymerized layers. If the layers are kept at substantially lower temperatures—for example, a temperature of −15° C. was studied—it is possible to fix the anisotropic effects for several hours. The inking is followed by the polymerization process which is preferably carried out under inert gas (nitrogen or argon) by means of UV radiation due to the radically hardening components of the liquid crystal mixture used in this example as well as the special sensitivity of the homogeneous texture to chemical and physical effects. In this case, polymer films are produced which have molecular structures which are ideally oriented in the same manner as the (monomer) components of the non-polymerized, oriented liquid crystal mixture, as a result of which the anisotropic properties are maintained.

Occasionally, a very slight, yet still visible shift of the reflected wavelengths occurs in the short-wave range due to primarily polymerization shrinking processes during hardening of the (wet) liquid crystal films.

In principle, all radiation sources which have an appropriate UV initial output in the required wavelength range are suitable for the hardening. Preferably, radiation sources are used in this case which, in addition to a high UV output, do not produce any additional thermal stress on the liquid crystal layer which could result in a change or disruption of the optical effect produced. In this example, several mercury low-pressure lamps are used which, in addition to pure 254 nm mercury line, can also exhibit other wavelength ranges in the UV-A, UV-B and/or UV-C due to the coatings of the quartz glass. Due to this advantageous temperature profile of these radiation sources, there are no further heat effects on the liquid crystal films during the drying process, as a result of which further impairment of the optical effects produced is excluded.

Advantageously, the resultant optical effects can be influenced by specific control of the applied temperature and/or UV intensity, so that the user, e.g. when using chirally nematic liquid crystal mixtures, can produce different reflecting colors.

After polymerization, the liquid crystal film thus produced has the desired optical effect, this effect no longer being dependent on the temperature since a transition from the mesophase into the isotropic phase is no longer possible due to the polymerization.

With high printing speeds, in particular in association with high layer thicknesses, however, an additional subsequent hardening with a further UV radiation source which optionally has a greater output may be required after the noted hardening at which the optical effects are fixed and thus become insensitive to higher temperatures in order to also polymerize non-polymerized residues within the liquid crystal film.

The substrates, e.g. films, can be cooled by means of a cooling roller in this case. The subsequent hardening can take place in the presence of oxygen, for example, in air, without affecting the homogeneous texture of the liquid crystal film since, after the prehardening, it is only slightly sensitive to heat or an inhibition of its (further) polymerization by oxygen.

All conventional printable print carriers are used as substrates, e.g. paper, cardboards and various plastic foils, e.g. polyolefins or cellophane, and metal foils, e.g. aluminum foil.

In the case of chirally nematic liquid crystals, the substrate is preferably blackened, so that opposite circularly polarized light, or light having a deviating wavelength, is absorbed. All reflective foils, e.g. coated with aluminum or aluminum ink, are suitable with nematic liquid crystals. The plastic material or the coating of the substrate must preferably be thermally stable up to a temperature of about 80° C., however, those thermoplastic materials which can be blended at least partially with the liquid crystal coating are also suitable. This is advantageous having regard to an increased adhesion of the liquid crystal films to the respective substances. However, a corona treatment of the substrate can also be useful for this purpose.

In a special embodiment, two printing mechanisms, each equipped with a UV drier, can be used, wherein the first UV drier is situated between the two printing mechanisms, the second UV drier behind the second printing mechanism. In this way, two different hot-melting inks, preferably two liquid crystal mixtures of a different composition, e.g. having opposite chirality, can be printed. An invisible pattern, e.g. a logo or coat of arms, can be produced in this way which can only be made visible with a suitable polarizer. However, the two liquid crystal mixtures can also be chemically and optically identical, a multicoloured image then being created e.g. by varying the UV intensity and/or the temperature during hardening of the two UV driers.

In a further variation, a thermal, commercially available inkjet printer is used instead of a heatable flexoprinting mechanism and the liquid crystal mixtures are printed as hot-melt inks in the drop-on-demand process in which droplets of the respective molten liquid crystal mixture is sprayed in an image-like pattern on a substrate, e.g. paper or a plastic film. Unlike the conventional flexoprinting process described above, the special advantage in this case is in the free programmability of the typographies.

In addition, the process according to the invention enables the combination of hot-melt inkjet and cliché-bound printing in such a way that a liquid crystal film applied by means of a cliché-bound printing process can be additionally imprinted, free of contact, without a further intersubstanceste hardening by means of hot-melt inkjet processes (wet-in-wet printing).

The first print layer applied according to the invention has such a high viscosity and stability that the application of ink droplets is possible without modifying the first print layer in its form.

The liquid crystal droplets orientate themselves very quickly by the forces acting during impact and the decrease in temperature, remain sufficiently long in the overcooled state and there is no undesirable "bleeding" on the surface. Due to the chemical compatiblity of the two liquid crystal films, a distinct cohesion is possible between them. On the other hand, the printing of an unhardened first print film with solvent-containing liquid crystal droplets would lead to a harmful penetration and mixing of the two liquid crystal films due to diffusion and extraction processes and the phenomenon of "bleeding" preferably occurs.

The combined layers thus produced exhibit different optical effects due to the locally varying thick layers or due to different combinations of the liquid crystal mixtures used.

The use of such inks in inkjet printers is thereby not restricted to piezo-operated printing processes in which the ink drops are ejected by contraction and expansion of a piezo element attached behind the nozzles, but thermal inkjet printers can also be used. In this case, mixtures of water and polyhydroxy compounds, e.g. ethylene glycol, diethylene glycol, propylene glycol and glycerin are preferably added to the liquid crystals as bubble-forming additives which drive the drops out of the nozzles by evaporation in the print heads.

In a further variation, an embossed print is produced in the print substrate by pressing e.g. the substrate to be printed with the liquid crystal material into the recesses of an engraved inking roll and permanently formed in this way. If e.g. a part of the embossing has the form of an inclined plane, an additional colour effect can be produced which is dependent on the viewing angle.

In a further embodiment, by way of example for a coating process, a chirally nematogenous liquid crystal mixture is filled in a high-pressure spray gun heated to 70° C. and the chirally nematic liquid crystal melt is applied to a black lacquered metal surface in the form of a spray mist at e.g. a pressure of 3 bar. The lacquering process is repeated until a homogeneous, uniformly covered surface is obtained. If the metal is additionally heated, various reflection wavelengths can be realized due to the dependency of the helical pitches of the temperature. It can be subsequently hardened with UV light and in the presence of nitrogen.

The prints and coatings prepared according to one of the preceding processes have flawless surfaces, excellent adhesive properties and scratch resistances.

The present invention is not restricted to the described, special embodiments since it is possible to apply liquid crystal materials of this type to many industrial branches.

The invention claimed is:

1. A method for applying substances comprising liquid crystals to substrates, the method comprising the steps of:
    maintaining the substance prior to application at a working temperature inside an applicator in a printing mechanism, the substance being in a liquid state at said temperature and the liquid crystal components contained in the substance being in a mesomorphous state;
    homogenizing the nematogenous and/or chirally nematogenous liquid-crystal components in a mixing apparatus prior to application; and reducing the homogenized substance to a microcrystalline mass after hardening and melting it in an ink chamber for application.

2. The method according to claim 1 wherein the substance is applied to a substrate by means of a printing method or coating method, in particular at a second temperature.

3. The method according to claim 1 wherein the liquid crystals are oriented by a decrease in temperature of the liquid crystals on the substrate.

4. The method according to claim 1 wherein the liquid crystal films produced are in the overcooled state after passing through the printing mechanism.

5. The method according to claim 1 wherein a printed substrate is cooled by means of a cooling roller.

6. The method according to claim 1 wherein the application of a substance is followed by a drying method, in particular while excluding oxygen.

7. The method according to claim 6 wherein the temperature of the drying method can be regulated.

8. The method according to claim 6 wherein the drying takes place by means of UV radiation sources.

9. The method according to claim 8 wherein the radiation intensity of the UV radiation sources can be regulated.

* * * * *